US012429820B2

(12) United States Patent
Laesser et al.

(10) Patent No.: US 12,429,820 B2
(45) Date of Patent: Sep. 30, 2025

(54) MECHANICAL REGULATOR FOR HOROLOGY COMPRISING A SEMI-DETACHED SELF-STARTING ESCAPEMENT WITH LOW LIFT ANGLE

(71) Applicant: CSEM Centre Suisse d'Electronique et de Microtechnique SA—Recherche et Développement, Neuchâtel (CH)

(72) Inventors: Olivier Laesser, La Chaux-de-Fonds (CH); Grégory Musy, Le-Mont-sur-Lausanne (CH)

(73) Assignee: CSEM Centre Suisse d'Electronique et de Microtechnique SA—Recherche et Développement, Neuchatel (CH)

( * ) Notice: Subject to any disclaimer, the term of this patent is extended or adjusted under 35 U.S.C. 154(b) by 326 days.

(21) Appl. No.: 17/937,808

(22) Filed: Oct. 4, 2022

(65) Prior Publication Data

US 2023/0106693 A1 Apr. 6, 2023

(30) Foreign Application Priority Data

Oct. 4, 2021 (EP) .................................... 21200709

(51) Int. Cl.
*G04B 15/14* (2006.01)
*G04B 18/02* (2006.01)

(52) U.S. Cl.
CPC ............ *G04B 15/14* (2013.01); *G04B 18/02* (2013.01)

(58) Field of Classification Search
CPC ................................ G04B 15/14; G04B 18/02
(Continued)

(56) References Cited

U.S. PATENT DOCUMENTS 3,628,327 A * 12/1971 Abe ...................... G04B 15/08 74/1.5
2012/0120774 A1* 5/2012 Fujieda .................. G04B 15/14 368/131
(Continued)

FOREIGN PATENT DOCUMENTS

CH 713150 A2 * 5/2018
CH 714361 A2 5/2019
(Continued)

OTHER PUBLICATIONS

Search Report issued in European Patent Application No. 21200709 dated Mar. 10, 2022.
(Continued)

*Primary Examiner* — Regis J Betsch
*Assistant Examiner* — Kevin Andrew Johnston
(74) *Attorney, Agent, or Firm* — McDonald Hopkins LLC

(57) ABSTRACT

A mechanical regulator for horology including an escapement collaborating with an oscillator provided with an inertial element oscillating in an oscillation plane by virtue of a return element. The escapement includes a pin rigidly connected to the inertial element, an anchor including a fork collaborating with the pin, and two pallet stones collaborating with teeth of an escape wheel. The regulator is configured such that, during a first frictional locking phase that occurs before an unlocking phase, and during a second frictional locking phase that occurs after an impulse phase, the pin is in contact with the fork so as to push same, and a tooth of the escape wheel is in rubbing contact with one of the pallet stones.

10 Claims, 13 Drawing Sheets

(58) Field of Classification Search
USPC .......................................................... 368/131
See application file for complete search history.

(56) References Cited

U.S. PATENT DOCUMENTS

| | | | | |
|---|---|---|---|---|
| 2012/0307601 | A1* | 12/2012 | Kruttli ................. | G04B 43/002 368/129 |
| 2015/0301501 | A1* | 10/2015 | Tu .......................... | G04B 15/10 368/132 |
| 2017/0010586 | A1 | 1/2017 | Di Domenico et al. | |
| 2019/0243308 | A1 | 8/2019 | Winkler et al. | |
| 2020/0064777 | A1* | 2/2020 | Heraud .................. | G04B 15/08 |
| 2020/0150595 | A1* | 5/2020 | Winkler ............... | G04B 17/045 |

FOREIGN PATENT DOCUMENTS

| | | | |
|---|---|---|---|
| CH | 715589 | A1 | 5/2020 |
| EP | 3035126 | B1 | 12/2017 |
| EP | 3327515 | A1 | 5/2018 |
| EP | 3545365 | B1 | 12/2020 |

OTHER PUBLICATIONS

Written Opinion issued in European Patent Application No. 21200709 dated Mar. 10, 2022.

Horlogerie-Suisse.Com: “Les angles parcourus par l’echappement”, Feb. 25, 2014, pp. 1-9, XP055899871, URL:https://www.horlogerie-suisse.com/technique/cours-d-echappement/les-angles-parcourus-par-l-echappement#:~:text=L%27angle%20de%20lev%C3%A9e%20virtuel%20de%20l%27ancre%20(th%C3%AAta,11%C2%B0%20et%2013%C2%B0.

* cited by examiner 21
130
122b
12
127
127a
112

130
127b 121
121a
112'

12
121
121a
112

130

127
127a
112'

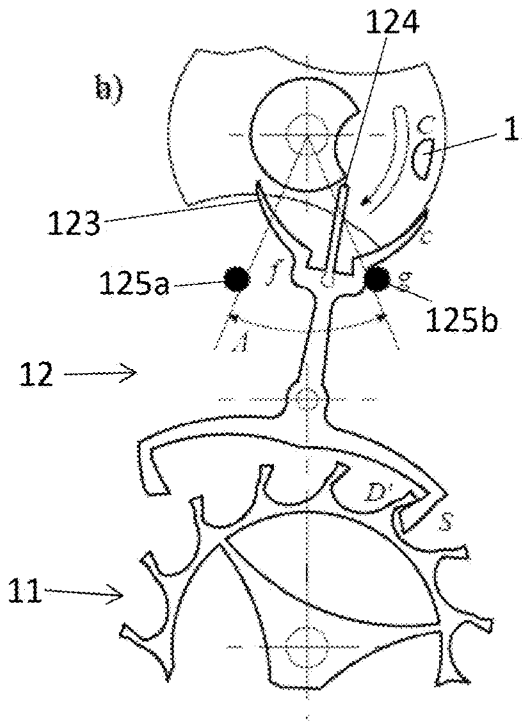
Fig. 18a
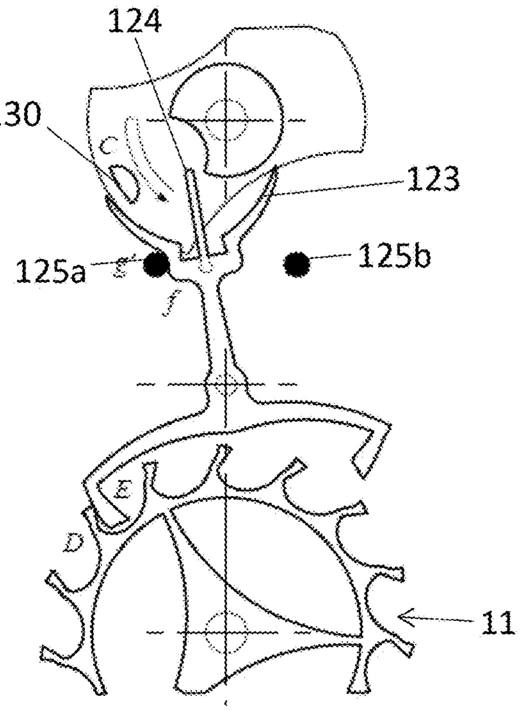
Fig. 18b
Fig. 19a
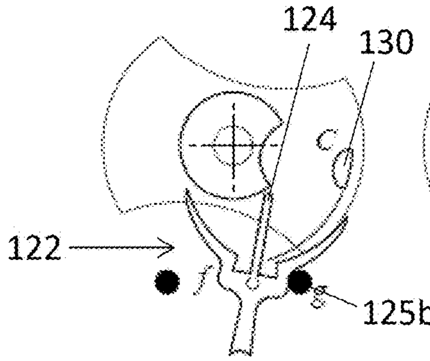
Fig. 19b
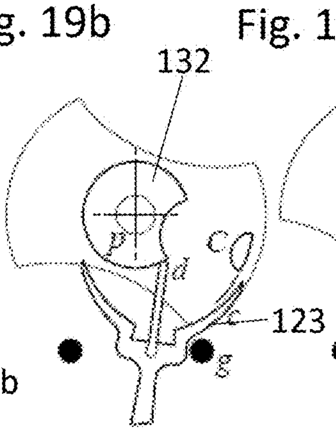
Fig. 19c
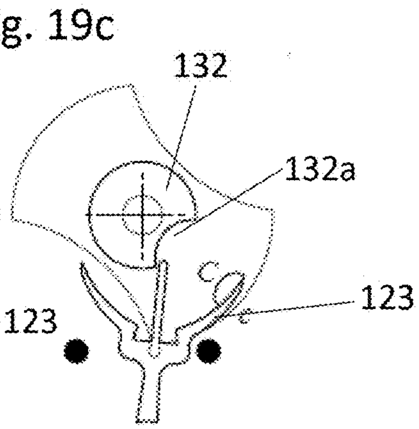
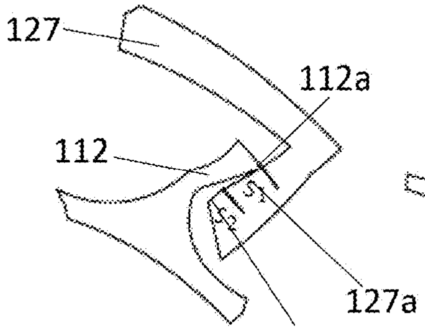
Fig. 19d
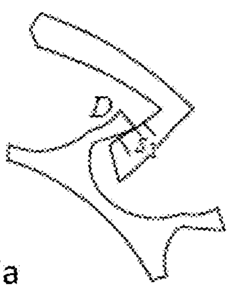
Fig. 19e
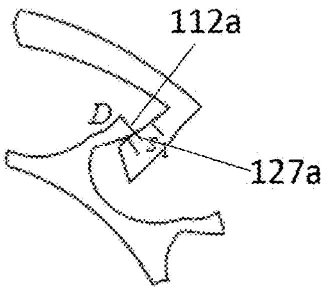
Fig. 19f

MECHANICAL REGULATOR FOR HOROLOGY COMPRISING A SEMI-DETACHED SELF-STARTING ESCAPEMENT WITH LOW LIFT ANGLE

TECHNICAL FIELD

The present invention relates to the field of horology, and more specifically the present invention relates to a mechanical regulator for horology comprising an escapement and an oscillator.

PRIOR ART

A horology regulator mechanism typically comprises an escapement as illustrated in FIG. 1. Such an escapement 10 typically comprises an escape wheel 11 equipped with teeth 112 configured to collaborate with pallet-stones 121 of an anchor 12. The anchor 12 comprises a fork 122 collaborating with a pin 130 of a disc 131. The disc 131 is rigidly connected to an oscillator (or regulator member), not depicted. The purpose of the escapement is to sustain and count the oscillations of the oscillator. A mechanical oscillator comprises an inertial element, a guide pivot and an restoring force element. For example, the mechanical oscillator may comprise a balance comprising a balance spring in which the balance constitutes the inertial element, guidance being provided by the balance staff and by the plate and bridge jewels, and the balance spring constitutes the restoring force element.

FIG. 2*a* shows a diagram indicating various angles of oscillation of the balance of an oscillator of the balance-spring type, collaborating with an escapement as described hereinabove. The balance, that has an amplitude $A_O$ of the order of 300°, may be characterized by a free-oscillation portion $\Theta_{LI}$ and an oscillation portion corresponding to the lift angle $\Theta_{LE}$, of the order of 50°, where the unlocking of the escape wheel and the impulse of the escapement to the inertial element occur. The amplitude $A_O$ is the maximum angular position, with respect to the center line, that the inertial element adopts during an oscillation (or beat). The center line $\theta_0$ is defined as being the angular position of the inertial element at equilibrium without the escapement (when the restoring force element is fully relaxed).

A flexure pivot, or flexible pivot, horology oscillator is an oscillator of which the inertial element (which may comprise a balance) is guided in rotation by an arrangement of elastic parts rather than by a physical staff rotating in conventional bearings (e.g. ruby bearings), as would be the case with a balance of the balance-spring type. In addition to performing the function of guiding rotation, the flexible pivot applies a restoring torque to the balance in the manner of the balance spring of an oscillator of the balance-spring type. FIG. 2*b* shows a diagram indicating various oscillation angles of a flexure-pivot oscillator (for example the one depicted in FIG. 19) collaborating with an escapement as described hereinabove. In this configuration, the inertial element, which has an amplitude $A_O$ typically comprised between 10° and 50°, is characterized by a free-oscillation portion $\Theta_{LI}$ typically of the order of 10° to 20°, and by a lift angle $\Theta_{LE}$ of the order of 6° maximum. Compared with an oscillator of the balance-spring type, a flexure-pivot oscillator is notable for its greater stiffness of the restoring force element and lower oscillation amplitudes $A_O$.

The lift half-angle $\Theta_{LE}/2$ of an oscillator corresponds to the angle between the center line of the inertial element $\theta_0$ and the angular position it has at the end of an impulse $\theta_{IM}$.

Thus, minimizing the lift angle $\Theta_{LE}$ amounts to bringing the angular position of end of impulse $\theta_{IM}$ closer to the center line $\theta_0$ and therefore to reducing the restoring torque of the oscillator at the end of the impulse, thereby facilitating self-starting.

In the case of a traditional Swiss anchor escapement 10 collaborating with a flexure-pivot oscillator, it is not possible to resize the fork to make it compatible with a balance lift angle $\Theta_{LE}$ of 6° or less. Specifically, were this to be attempted, the clearances and safety features between the fork and the disc pin would be unachievable in practice. Furthermore, because of the greater stiffness of the restoring force element of a flexure-pivot oscillator in comparison with a balance-spring type oscillator, it would then be difficult to ensure the self-starting of a flexure-pivot oscillator.

Self-starting is the property of an escapement which starts only by virtue of the torque supplied by the escape wheel following the rewinding of the barrel in its working zone. Self-starting ensures that the oscillator self-starts without external aid during the barrel rewinding phase, for example after the watch has been stored for a lengthy period. Self-starting is an advantageous property for any escapement of a wristwatch, because a wristwatch is regularly subjected to knocks which cause the balance to be braked against its shock absorbers. Such braking actions may cause the balance to stop momentarily. If the escapement is not self-starting, the balance will remain immobilized until the user or a horologist intervenes. Thus, an escapement that is not self-starting presents problems of reliability in the context of a wristwatch.

A system is self-starting when the torque at the escape wheel is sufficient to, amongst other things, complete the impulse phase. The restoring torque of the oscillator (this restoring torque is directly proportional to the stiffness of the return spring and to the angular position of end of impulse $\theta_{FI}$) is then counterbalanced by the torque at the escape wheel. Increasing the torque at the escape wheel to ensure the self-starting of a flexure-pivot oscillator amounts to increasing the energy consumption thereof, and is not a satisfactory solution given that the energy available in a wristwatch is limited.

Document CH715589A1 describes a dead-beat escapement which is well suited to a flexure-pivot oscillator. The advantage of a dead-beat escapement is that it can be dimensioned to be compatible with a lift angle $\Theta_{LE}$ at the balance of less than 6°, which is advantageous for self-starting. The disadvantage is that the balance is connected to the anchor (elastically in this specific instance) which means permanent rotation of the anchor during the oscillation of the balance and therefore permanent rubbing contact between the escape wheel and the anchor. The loss of energy as a result of this rubbing contact is substantial, and de facto limits the amplitudes of operation of the oscillator to smaller values, of the order of 6 to 8°. By contrast, the Swiss anchor escapement is a detached escapement because it comes into contact with the oscillator only during the lift angle in order to perform the unlocking and impulse phases.

One example of a detached escapement that has been adapted to suit a flexure-pivot oscillator is set out in document CH714361. That document describes a regulator with a flexible pivot resonator equipped with a detached anchor escapement with a fork that is enlarged in comparison with that of a conventional Swiss anchor. The escapement is particularly well suited to the flexible pivot set out in document EP3035126 and goes hand in hand with the flexure-pivot resonator mechanism disclosed in document EP3545365. The latter document describes a detached anchor escapement with a lift angle $\Theta_{LE}$ of 10°, having inertial elements with specific properties. This escapement follows the traditional dynamics with a free-oscillation phase then a unlocking followed by an impulse phase. Because of its excessively large (10°) lift angle, the escapement in question cannot be both self-starting and have an escape wheel torque that is low enough to offer reasonable energy consumption.

BRIEF SUMMARY OF THE INVENTION

The present invention relates to a mechanical regulator for horology comprising an escapement collaborating with a mechanical oscillator for horology provided with an inertial element oscillating in an oscillation plane by virtue of an restoring force element. The escapement comprises a pin rigidly connected to the inertial element, an anchor and an escape wheel. The anchor comprises a fork configured to collaborate with the pin, an entry pallet stone and an exit pallet stone, each of the pallet stones being configured to collaborate with teeth of the escape wheel. The escapement is configured such that, during an unlocking phase, the pin pushes the fork in order to release the escape wheel from one of the pallet stones and, during an impulse phase, the fork pushes the pin in order to transmit to the inertial element the torque of the escape wheel that is in contact with one of the pallet stones. The regulator is configured such that the unlocking phase is preceded by a first frictional locking phase, itself preceded by a first free-oscillation phase, and the impulse phase is followed by a second frictional locking phase, itself followed by a second free-oscillation phase. During each of the free-oscillation phases, the inertial element oscillates freely with no contact between the pin and the fork; and during the first and second frictional locking phase, the pin is in contact with the fork so as to push it, a tooth of the escape wheel being in rubbing contact with one of the pallet stones.

According to one embodiment, each pallet stone is provided with a unlocking face that comes into contact with a tooth during the unlocking phase, and with an impulse face that comes into contact with a tooth during the impulse phase. Each of the pallet stones is further provided with a pallet frictional locking face configured to come into rubbing contact with a tooth during the first and second frictional locking phase.

The escapement is a dead-beat escapement during a given oscillation portion, but is detached outside of this oscillation portion. The frictional locking oscillation portions make it possible to ensure that the oscillator is self-starting because, thanks to them, it is possible to construct a fork-pin mechanism that has a very low lift angle as well as reasonable clearances and safety features. The lift angle is at least a factor of two smaller than can be achieved with the escapements proposed in the prior art, namely typically between 2° and 6°. The escapement thus makes it possible for the oscillator to regain its self-starting property, even when the amplitude of operation of the oscillator is low and its stiffness is high.

The regulator according to the invention also allows the inertial element an oscillation portion which to a large extent is detached, so that there is no rubbing contact between the escape wheel and the anchor during a large portion of the oscillation of the inertial element. That makes it possible to minimize the energy loss of the regulator and therefore obtain a higher amplitude for the inertial element. That makes it possible to ensure the isochronism of a flexure-pivot oscillator (for most flexure-pivot oscillators and escapements, deficiencies in isochronism generally become critical below 10° of amplitude) and renders the inertial element less susceptible to being disrupted by knocking against banking pins.

The regulator described here can be applied to any type of escapement of which the wheel and the anchor form a double-impulse escapement. For example, the principle may be easily applied in the case of a lever escapement. The regulator proposed here greatly simplifies the design of the oscillator in comparison with the solution proposed in document CH714361. For example, given the small amplitudes that characterize flexure-pivot oscillators, the anchor of the present invention has no need for a guard pin in order to collaborate with such an oscillator. The anchor and the wheel can therefore be components produced on a single level.

The regulator described here is simple in its implementation and is able to ensure low energy consumption and self-starting of a flexure-pivot oscillator.

BRIEF DESCRIPTION OF THE FIGURES

Exemplary implementations of the invention are indicated in the description illustrated by the attached figures in which:

FIGS. 18*a*-18*b* show phases of the escapement for amplitudes of oscillation beyond the frictional locking half-angle;

FIGS. 19*a*-19*f* illustrate various positions of the fork and of a tooth with respect to the pallet stones for amplitudes of oscillation of the inertial element beyond the frictional locking half-angle;

EXEMPLARY EMBODIMENT(S) OF THE INVENTION

Figure 1:
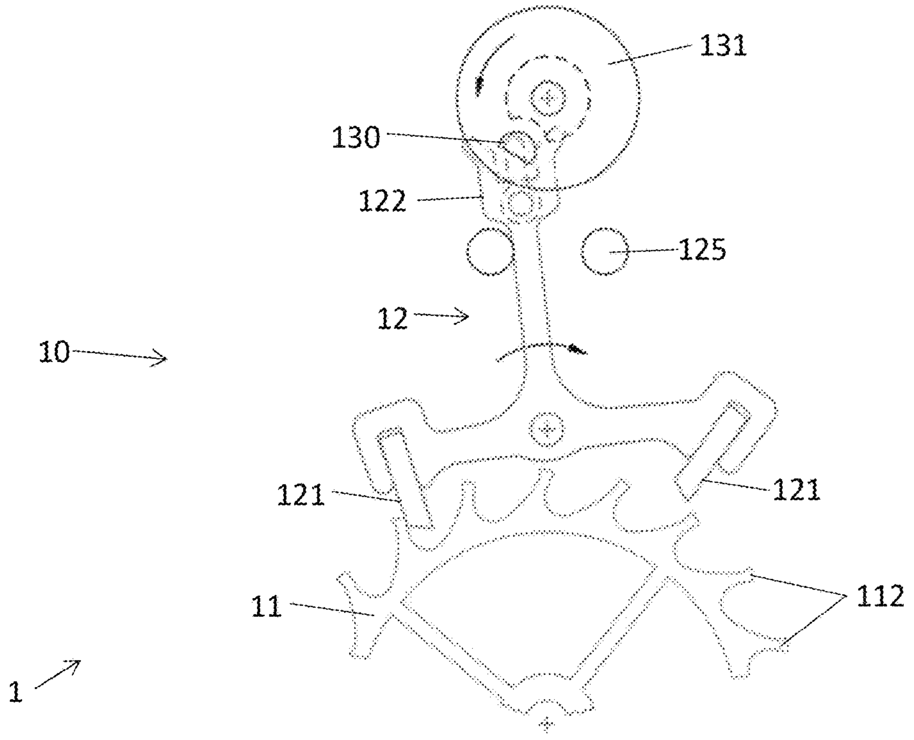
Fig. 1 PRIOR ART
FIG. 1 illustrates a conventional horology regulator.
Figure 2A:
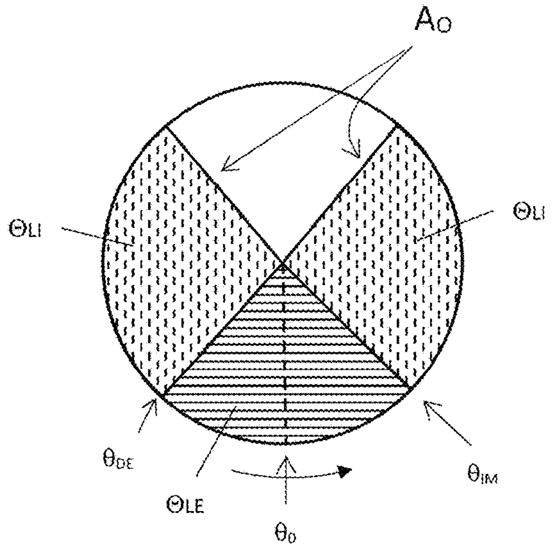
FIGS. 2*a* and 2*b* show the amplitude of oscillation and the lift angle for an oscillator of the balance-spring type (FIG. 2*a*) and for a flexure-pivot oscillator (FIG. 2*b*)
Figure 2B:
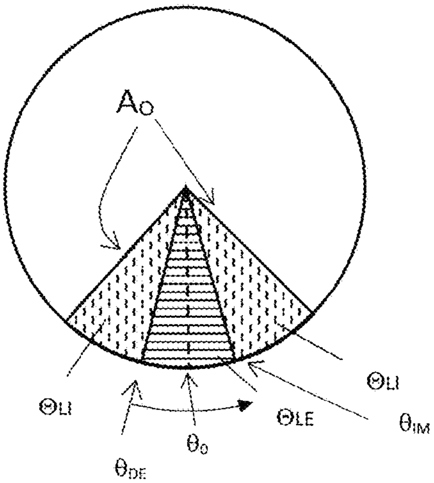
Figure 3:
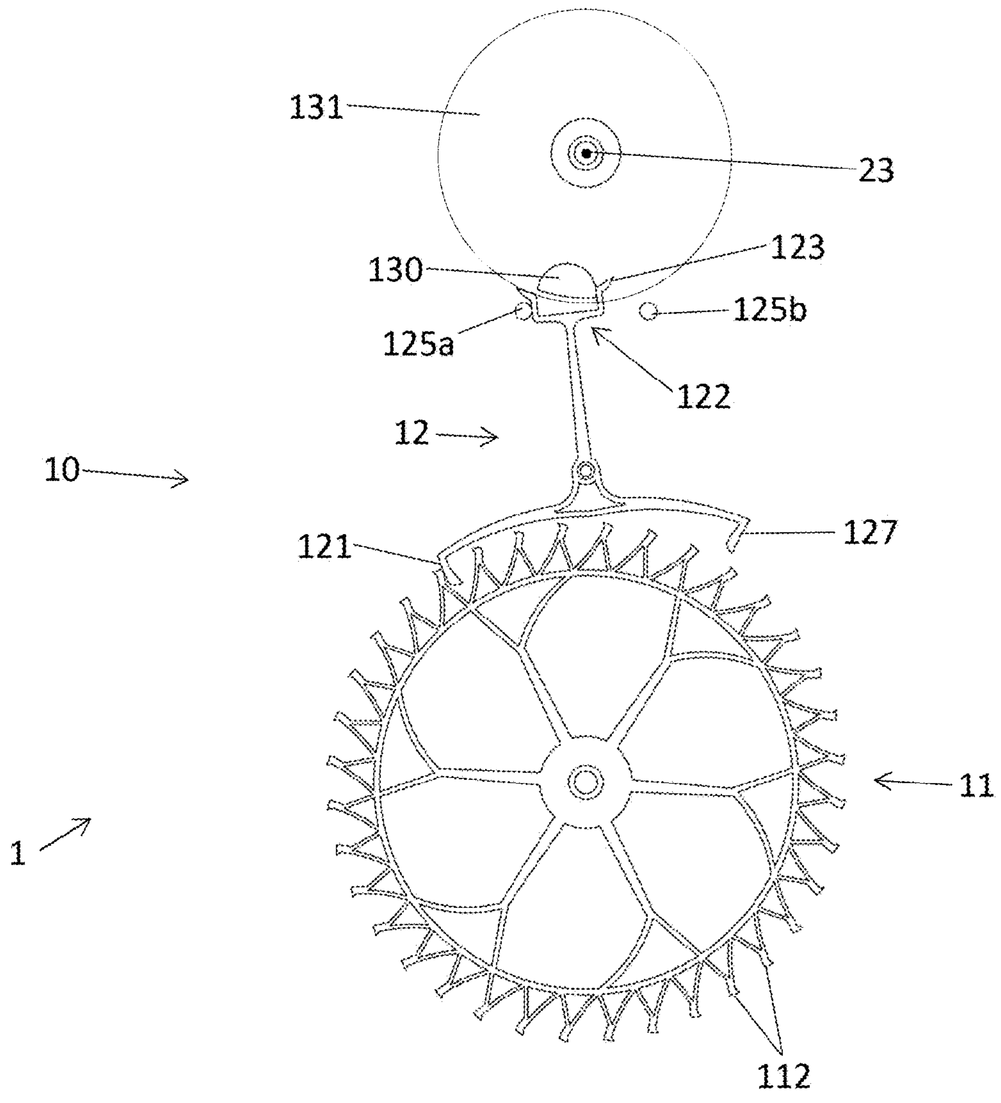
FIG. 3 shows a regulator of which the escapement comprises a pin, a fork and an escape wheel, according to one embodiment.

FIG. 3 shows a regulator 1 comprising an escapement 10 according to one embodiment. The escapement 10 comprises an escape wheel 11 equipped with teeth 112 which are configured to collaborate with an entry pallet stone 121 and an exit pallet stone 127 of an anchor 12. The anchor 12, mounted with the ability to pivot on a staff, comprises a fork 122 collaborating with an impulse cam 130 (in this instance a pin) of a disc 131. The escapement 10 collaborates with an oscillator (not depicted) comprising an inertial element 21 (for example a balance or the like) able to oscillate about an oscillator staff 23 by virtue of a restoring force element. The disc 131 is intended to collaborate with the oscillator. For example, the disc 131 may be arranged concentrically with the oscillator so as to pivot with an inertial element, as in a conventional horology regulator mechanism.

Figure 4A:
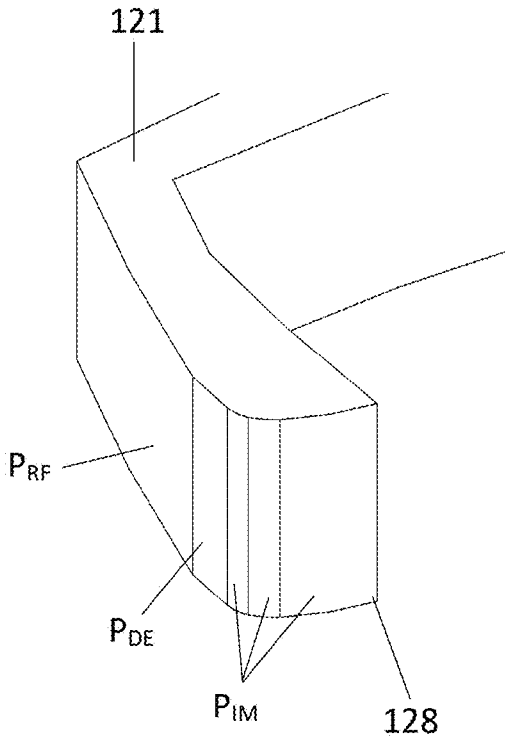
FIGS. 4*a*-4*c* show a detail of the entry pallet stone (FIG. 4*a*), of the exit pallet stone (FIG. 4*b*) of the fork and of a tooth of the escape wheel (FIG. 4*c*)
Figure 4B:
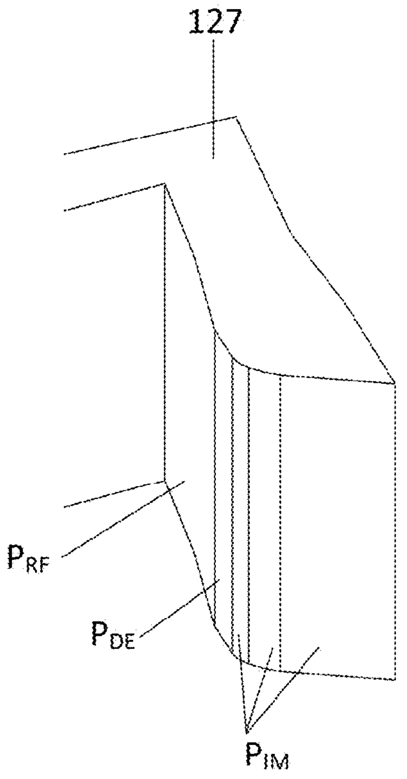
Figure 4C:
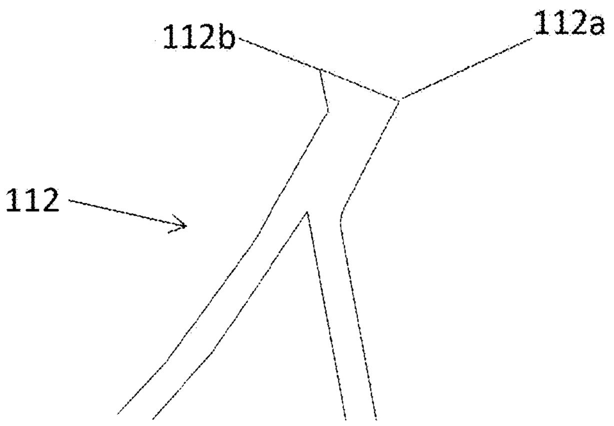

FIG. 4*a* shows a detail of the entry pallet stone 121, FIG. 4*b* shows a detail of the exit pallet stone 127, and FIG. 4*c* shows a detail of a tooth 112 comprising a tooth tip 112*a* and a tooth heel 112*b*. The entry pallet stone 121 and the exit pallet stone 127 are each provided with a pallet frictional locking face $P_{RF}$, a pallet unlocking face $P_{DE}$, and a pallet impulse face $P_{IM}$. Here, the pallet unlocking face $P_{DE}$ corresponds to a face of rest, which is to say the face on which a tooth 112 of the escape wheel presses at the moment of unlocking thereof.

In the example of FIGS. 4*a*-4*b*, the pallet impulse face $P_{IM}$ comprises three sections with variable curvature which are continuous and tangential. However, the pallet impulse face $P_{IM}$ may equally be formed as a single or a plurality of curved or planar sections. The pallet frictional locking face $P_{RF}$ and the pallet unlocking face $P_{DE}$ are also depicted as two continuous sections with different curvatures although these two faces could equally be produced as one single face. As a preference, the pallet frictional locking face $P_{RF}$ has a draw and the pallet unlocking face $P_{DE}$ may or may not have a draw. A draw means that these two pallet faces may be oriented in such a way that the force exerted by the tip 112*a* of the tooth 112 against one of these pallet faces generates on the anchor 12 a torque that causes it to rotate against one of its banking pins 125*a*, 125*b*. The draw ensures that the anchor stops in a clearly determined position, defined by its banking pins 125, during free oscillation of the inertial element 21. During the first phase of free oscillation there is no contact between the pin 130 and the fork 122. Contact between the pin 130 and the fork 122 occurs during the first frictional locking phase.

The pallet stones 121, 127 of the anchor 12 of the escapement 10 therefore comprise an additional face of rest, the pallet frictional locking face $P_{RF}$, configured to immobilize the escape wheel 11 during the frictional locking of the escapement.

Figure 5A:
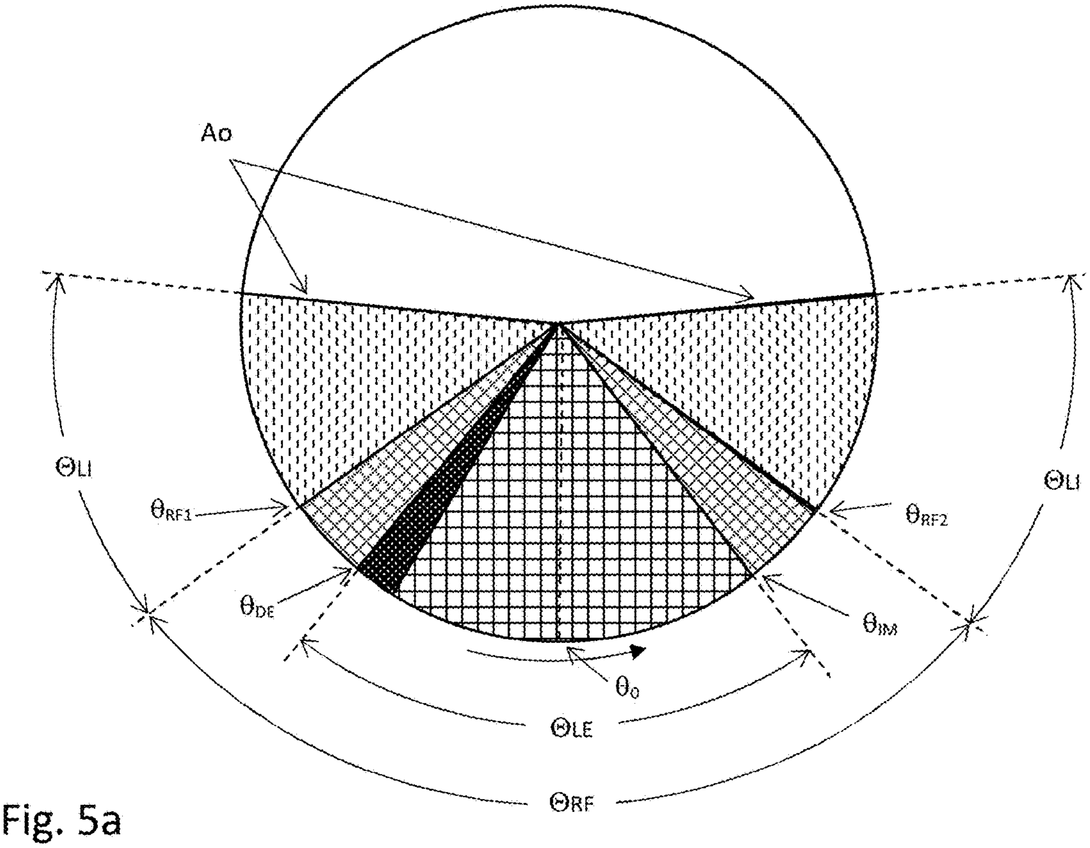
FIGS. 5*a* and 5*b* show a diagram indicating various angles of oscillation of an inertial element of a flexure-pivot oscillator collaborating with the escapement 10 when the oscillator is oscillating in the anticlockwise direction (FIG. 5*a*) and clockwise direction (FIG. 5*b*)
Figure 5B:
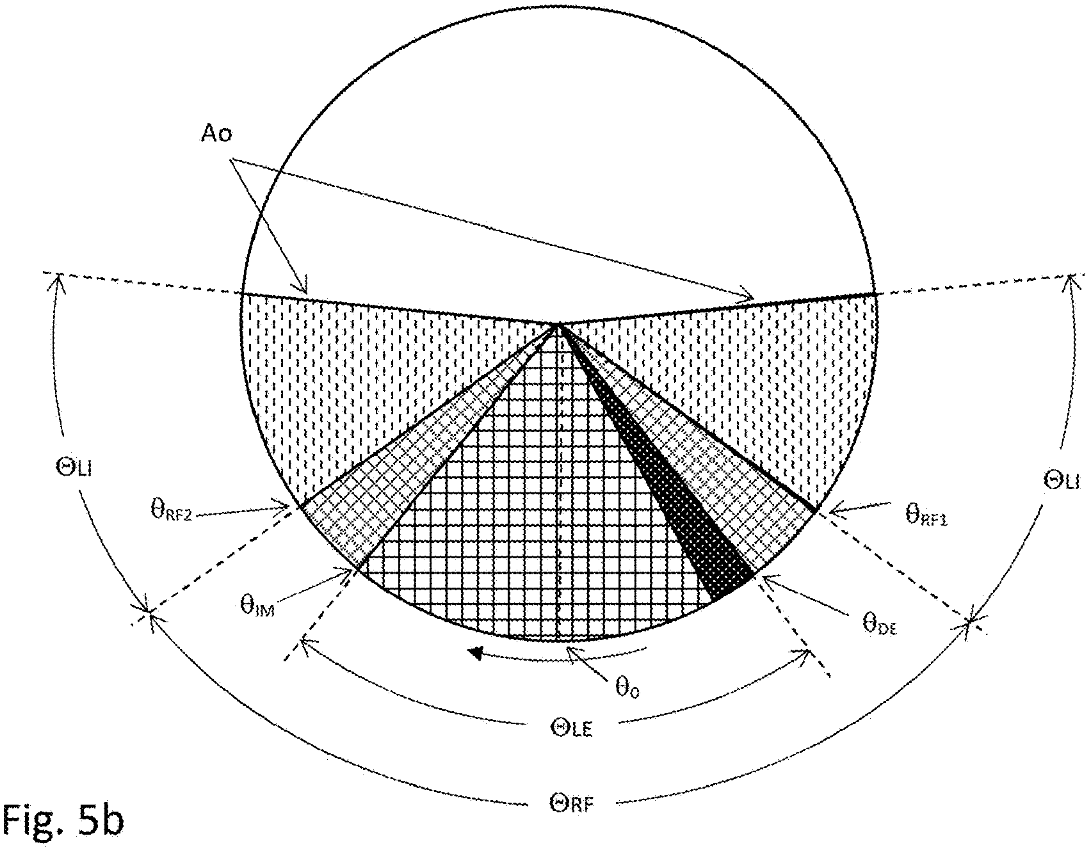

FIGS. 5*a* and 5*b* show a diagram indicating various angles of oscillation of an inertial element of a flexure-pivot oscillator collaborating with the escapement 10 when the oscillator is oscillating in the anticlockwise direction (FIG. 5*a*) and in the clockwise direction (FIG. 5*b*). The escapement 10 has two different operating regimes. On starting, the escapement 10 operates like a dead-beat escapement, which is to say that the amplitude of oscillation of the inertial element is greater than the lift half-angle $\Theta_{LE}/2$ and less than the frictional locking half-angle $\Theta_{RF}/2$. The lift angle $\Theta_{LE}$ corresponds to the portion of oscillation of the inertial element from the angular position at the start of unlocking $\theta_{DE}$ to the angular position at the end of the impulse $\theta_{IM}$. The frictional locking angle $\Theta_{RF}$ corresponds to the portion of oscillation from the angular position of the inertial element at the start of the first frictional locking $\theta_{RF1}$ to the angular position at the end of the second frictional locking $\theta_{RF2}$.

At a greater amplitude of oscillation of the inertial element, greater than the frictional locking half-angle $\Theta_{RF}/2$, the oscillator also has a free-oscillation portion (free-oscillation angle $\Theta_{LI}$).

FIGS. 6 to 15 show the escapement 10 during the various phases of its operation. The diagram of FIG. 5 is also reproduced: the angle of the oscillator 2 corresponding to the phase illustrated is indicated therein by an arrow. Note that a drop (or the uptake of fork clearance) occurs as a transition between two phases of operation of the escapement and is not considered to be a phase of the escapement. Note that, for ease of analysis and understanding of an escapement, it is common practice to make the approximation that the inertial element does not pivot during a drop. The drop is added to the construction of the escapement to prevent the locking-up of the mechanism that would be brought about by double contact between two parts of the escapement (escapement safeties). The drop is dimensioned according to the system manufacture and assembly tolerances. It needs to be minimized because it causes a loss of energy that does not contribute to the precision of the time base of the system.

Normal (Large-Amplitude) Operation

Figure 6:
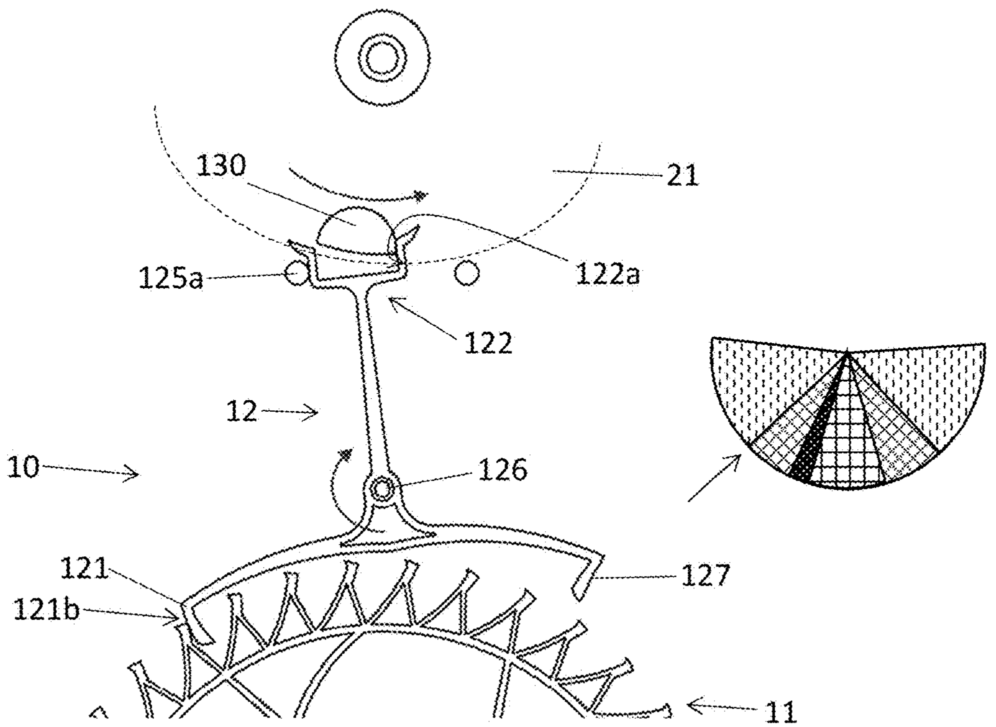
FIG. 6 shows the escapement at the start of a first frictional locking phase when the oscillator is oscillating in the anticlockwise direction.

FIG. 6 shows the escapement 10 at the start of a first frictional locking phase, when the oscillator is oscillating in the anticlockwise direction. The first frictional locking phase occurs after a first free-oscillation phase during which the inertial element 21 oscillates freely and without contact between the pin 130 and the fork 122. The first frictional locking phase occurs before a phase of unlocking of the escapement 10. In the first frictional locking phase, which does not exist in a conventional detached anchor escapement, the escape wheel 11 is immobilized by the anchor 12 and is unable to advance. The pin 130 (for example arranged coaxial with an axis of the inertial element) rotates in the anticlockwise direction and encounters a first fork face 122*a* of the fork 122. The anchor 12 then pivots in the clockwise direction (about its pivot staff 126). Under the action of the pin 130 on the fork 122, the pallet stone 121 will make the escape wheel 11 recoil slightly. A tooth 112 of the escape wheel is in rubbing contact with the pallet frictional locking face $P_{RF}$ of the entry pallet stone 121.

During the first entry frictional locking phase, the anchor 12 rotates whereas the escape wheel 11 is practically immobile. There is therefore rubbing contact between a tooth 112 and the entry pallet stone 121 (on the pallet frictional locking face $P_{RF}$) of the anchor 12. During the first frictional locking phase, the inertial element oscillates from the angular position of the start of the first frictional locking $\theta_{RF1}$ to the angular position of the start of unlocking $\theta_{DE}$.

Figure 7:
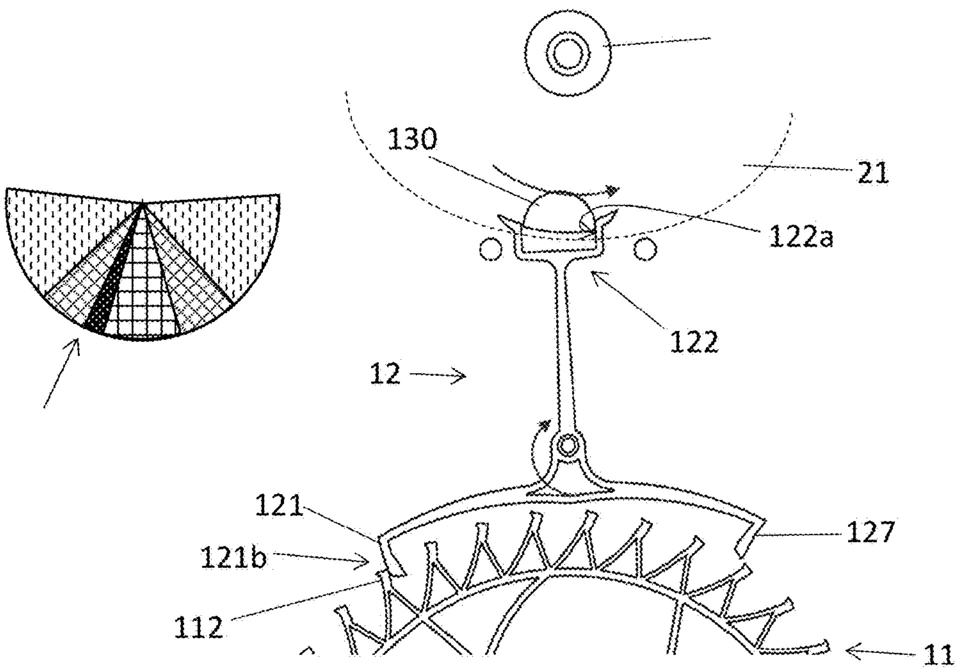
FIG. 7 shows the escapement at the start of a unlocking phase.

FIG. 7 shows the escapement 10 at the start of a unlocking phase corresponding to the end of the first frictional locking. During the unlocking phase, the balance pin 130 continues to rotate in the anticlockwise direction and to push on the first fork face 122*a* of the fork 122. The escape wheel 11 is immobile, or recoils slightly, and the anchor 12 continues to rotate in the clockwise direction. A tooth 112 of the escape wheel 11 leaves the pallet frictional locking face $P_{RF}$ to arrive at the pallet unlocking face $P_{DE}$ of the entry pallet stone 121. At the start of the unlocking phase, the angular position of the inertial element is that of the start of unlocking $\theta_{DE}$.

Figure 8:
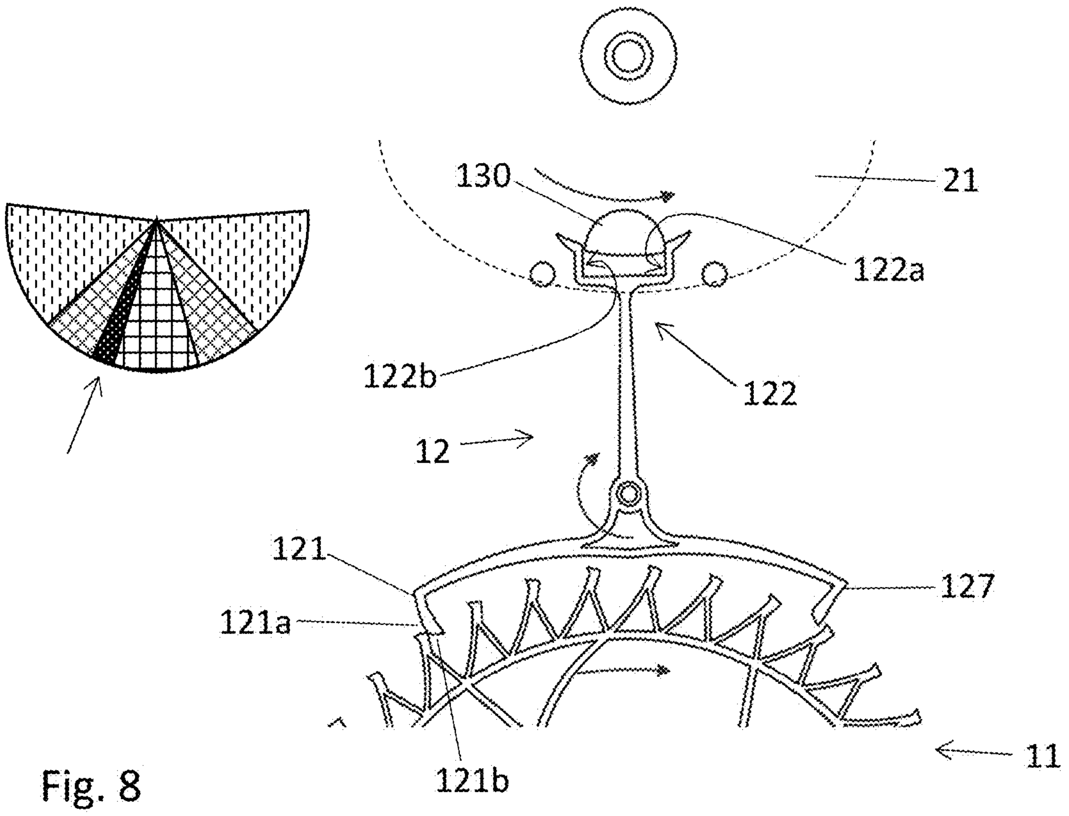
FIG. 8 shows the escapement during a first uptake of fork clearance.

FIG. 8 shows the escapement 10 at the start of the taking-up of clearance of the fork 122, which occurs at the end of the unlocking phase. The start of the taking-up of clearance of the fork 122 is identical to that of a conventional anchor escapement. The pin 130 continues to rotate in the anticlockwise direction. A tooth 112 of the escape wheel 11 leaves the pallet unlocking face $P_{DE}$ to arrive at the pallet impulse face $P_{IM}$ of the entry pallet stone 121. The escape wheel 11 will then activate the anchor 12 and this will allow the second fork face 122*b* to catch up with the pin 130 and strike it once all of the clearance of the fork 122 has been taken up. The restoring force torque of the oscillator needs to be dimensioned at least so that it can, without a runup, return the escapement 10 to the position of FIG. 8. If it is unable to do so, the escapement 10 is not self-starting.

Figure 9:
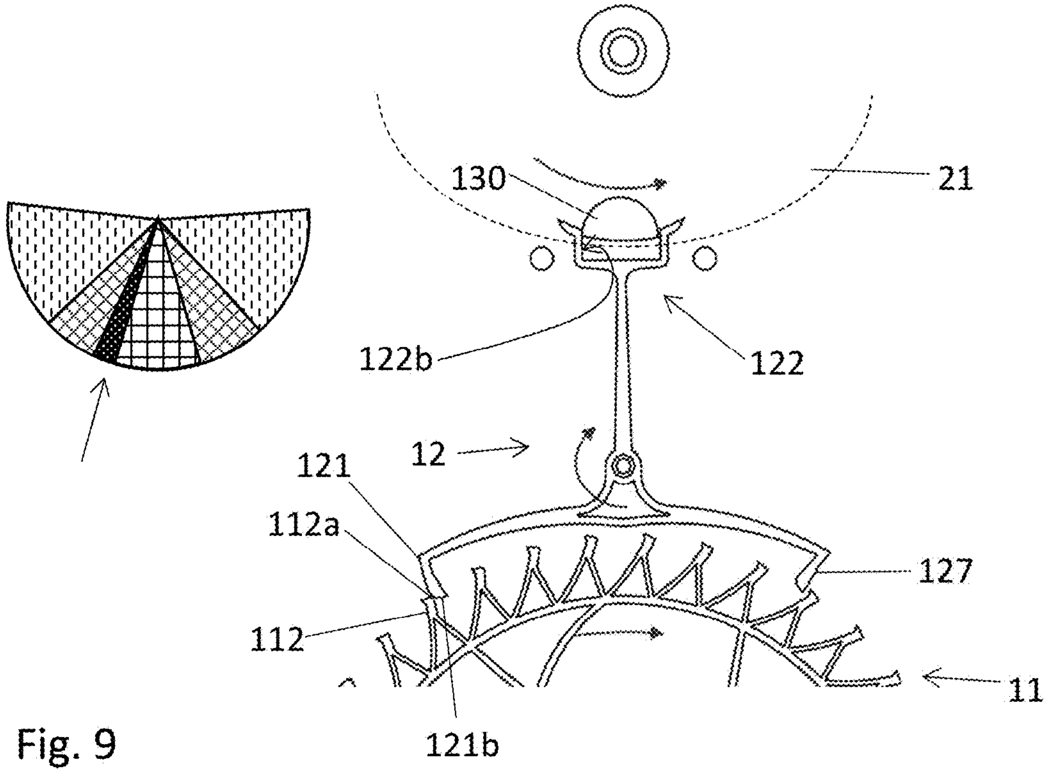
FIG. 9 shows the escapement at the start of an impulse phase.

FIG. 9 shows the escapement 10 at the start of an impulse phase that occurs at the end of the first fork drop and corresponds to the start of the impulse of the entry pallet stone 121. This first impulse phase is identical to that of a conventional anchor escapement. The pin 130 continues to rotate in the anticlockwise direction. The second fork face 122*b* of the fork 122 has reached the pin 130 and is beginning to push the pin 130 in the anticlockwise direction. The escape wheel 11 continues to rotate in the clockwise direction and actuates the pin 130 via the anchor 12. The tip 112*a* of the tooth 112 of the escape wheel 11 pushes on the pallet impulse face $P_{IM}$ of the entry pallet stone 121.

Figure 10:
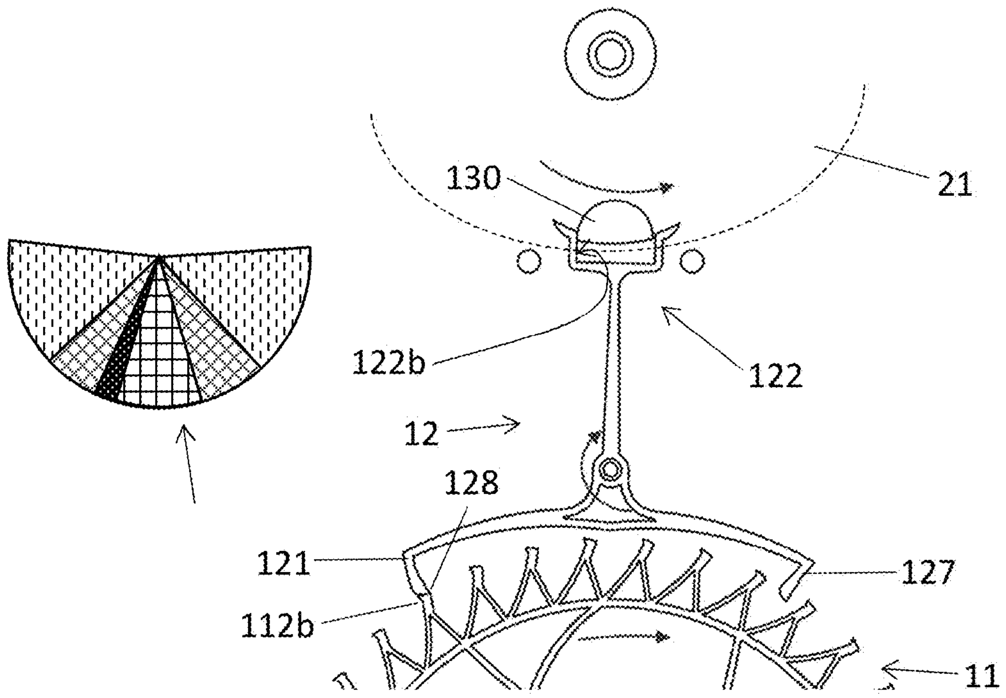
FIG. 10 shows the escapement during the impulse phase.

FIG. 10 shows the escapement 10 during the impulse phase, at the transition between the impulse of the tip 112*a* of the tooth on the pallet face and the impulse of the flight of the tooth on the tip of the pallet stone. The pin 130 continues to rotate in the anticlockwise direction and the second fork face 122*b* continues to push the pin 130 in the anticlockwise direction. The escape wheel 11 also continues to rotate in the clockwise direction and actuates the pin 130 via the anchor 12. The second part of the impulse phase, and with it the first impulse, ends when the pallet stone tip 128 reaches the heel 112*b* of the tooth of the escape wheel 11 (see also FIG. 4*a*).

Figure 11:
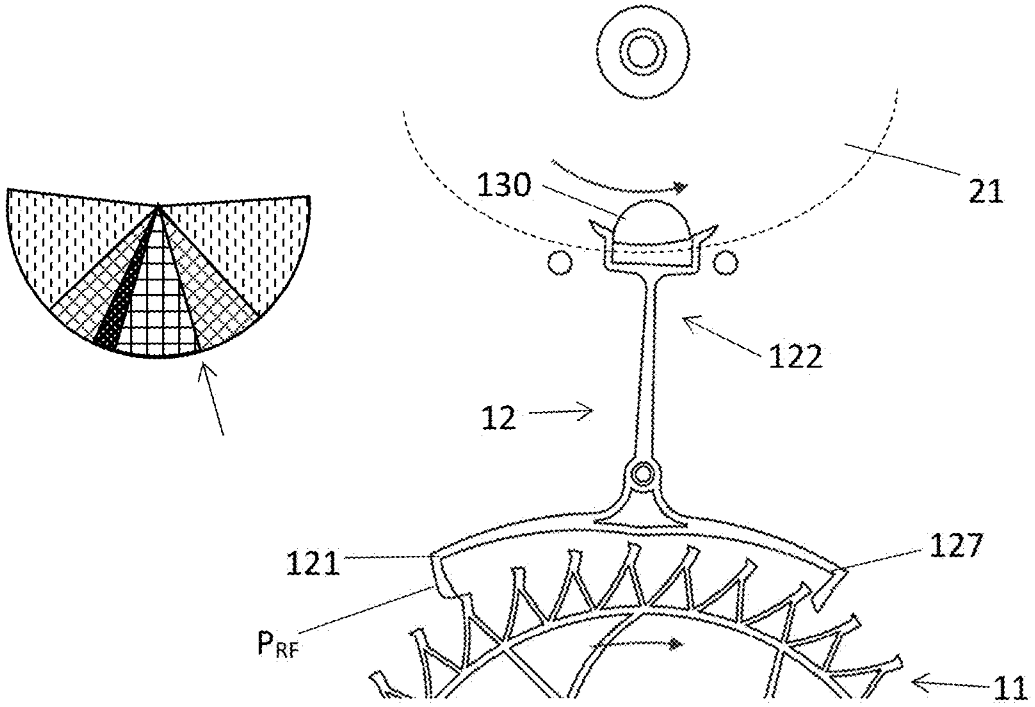
FIG. 11 shows the escapement at the start of a first drop of the escape wheel.

FIG. 11 shows the escapement 10 during a first drop of the escape wheel 11 and a second drop of the fork 122 which occur at the end of the impulse phase. This transition is identical to that of a conventional anchor escapement in the case of the drop of the escape wheel 11. However, in a conventional escapement, there is no second drop of the fork 122 because the pin 130 leaves the fork 122 at the end of the impulse without reaching the first fork face 122*a*. In the present transition, the pin 130 continues to rotate in the anticlockwise direction. The pin 130 leaves the second fork face 122*b* because the anchor 12 is no longer actuated by the escape wheel 11. A tooth 112 of the escape wheel 11 separates from the end of the pallet impulse face $P_{IM}$ of the entry pallet stone 121. The escape wheel 11 drops, which is to say rotates idly and reaches the pallet frictional locking face $P_{RF}$ of the exit pallet stone 127.

During this transition that corresponds to the drop of the escape wheel and the second drop of the fork, the angular position of the inertial element corresponds approximately to the angular position of the end of impulse $\theta_{IM}$ relative to the reference position of the line of centres $\theta_0$ (this corresponds to the lift half-angle $\Theta_{LE}/2$). Unlike a conventional escapement, the escapement 10 is characterized by a lift angle $\Theta_{LE}$ typically of at most 6°.

Figure 12:
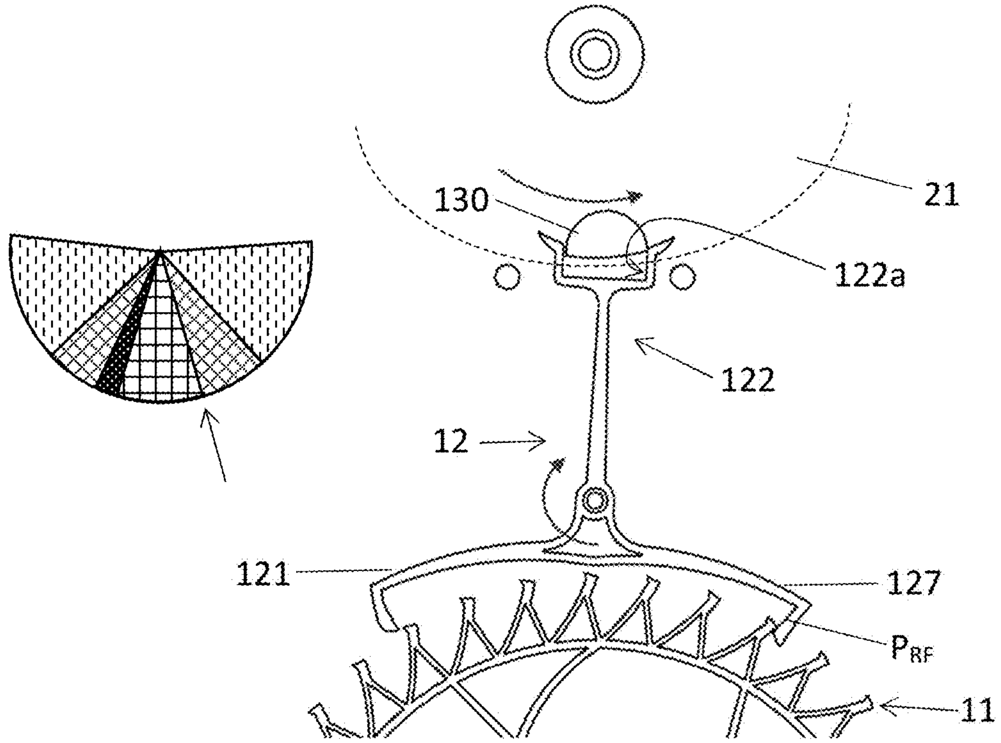
FIG. 12 shows the escapement at the start of a second frictional locking phase after a second uptake of fork clearance.

FIG. 12 shows the escapement 10 at the start of a second frictional locking phase that occurs after the impulse phase, at the end of the drop of the escape wheel 11 and of the second drop of the fork 122. This second frictional locking phase does not exist in a conventional anchor escapement. The pin 130 continues to rotate in the anticlockwise direction, reaches the first fork face 122*a* and pushes on the fork 122 in order to disengage therefrom. The escape wheel 11 is immobilized by the anchor 12 but pivots very slightly in the clockwise direction because of the draw. The anchor 12 still pivots in the clockwise direction under the action of the pin 130. The tip 112*a* of the tooth 112 of the escape wheel 11 will therefore rub against the pallet frictional locking face $P_{RF}$ of the exit pallet stone 127. There is therefore rubbing contact between the escape wheel 11 and the anchor 12 and between the anchor 12 and the pin 130.

Here, the expression “rubbing contact” means that, at the point of contact between the tooth 112 and the pallet frictional locking face $P_{RF}$ and between the pin 130 and the first fork face 122*a*, there is regular relative motion between these escapement components during the first and second frictional locking phase.

During the second frictional locking phase, the angular position of the inertial element moves from the angular position of the end of impulse $\theta_{IM}$ to the angular position of the end of the second frictional locking $\theta_{RF2}$.

Figure 13:
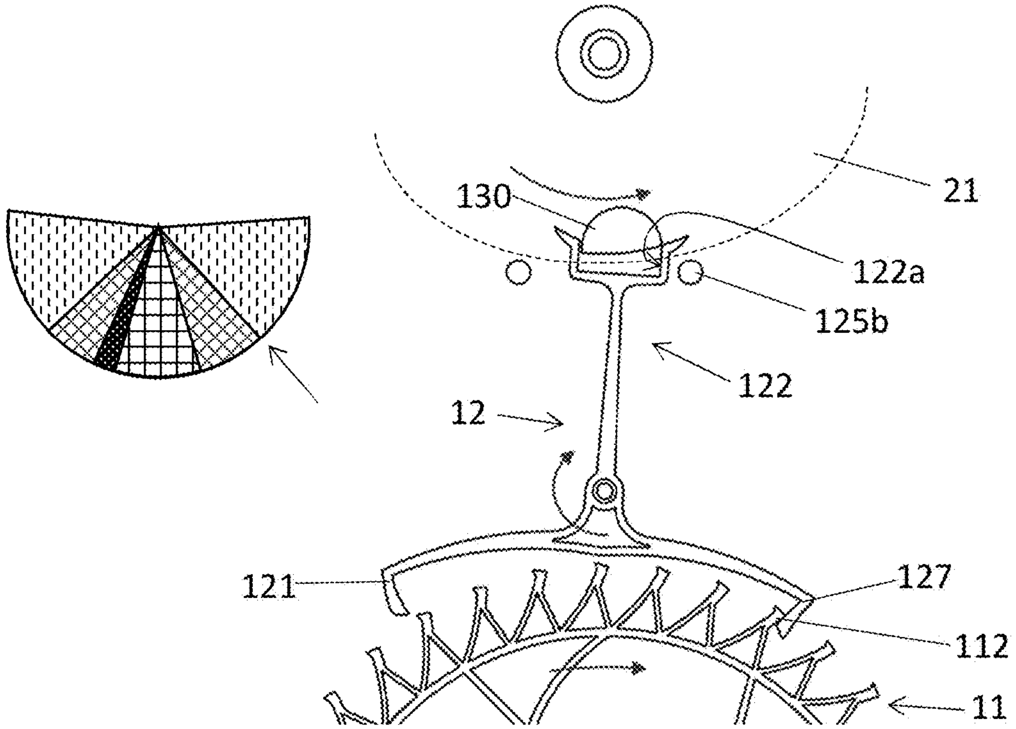
FIG. 13 shows the escapement at the end of a second frictional locking phase.

FIG. 13 shows the escapement 10 at the end of the second frictional locking phase. The pin 130 has finished pushing the first fork face 122*a* and come free thereof. The anchor 12 has not yet reached the exit banking pin 125*b*, so that the draw is therefore not finished. A tooth 112 of the escape wheel 11 is bearing against the pallet frictional locking face $P_{RF}$ of the exit pallet stone 127. The escape wheel 11 transmits a torque to the anchor 12 which allows it to still pivot in the clockwise direction to reach the exit banking pin 125*b* and its rest position.

During the draw, the angular position of the inertial element is slightly greater than the angular position of the end of the second frictional locking $\theta_{RF2}$. In a similar way to the drops, this document does not consider the draw, strictly speaking, to be a phase of the escapement.

Figure 14:
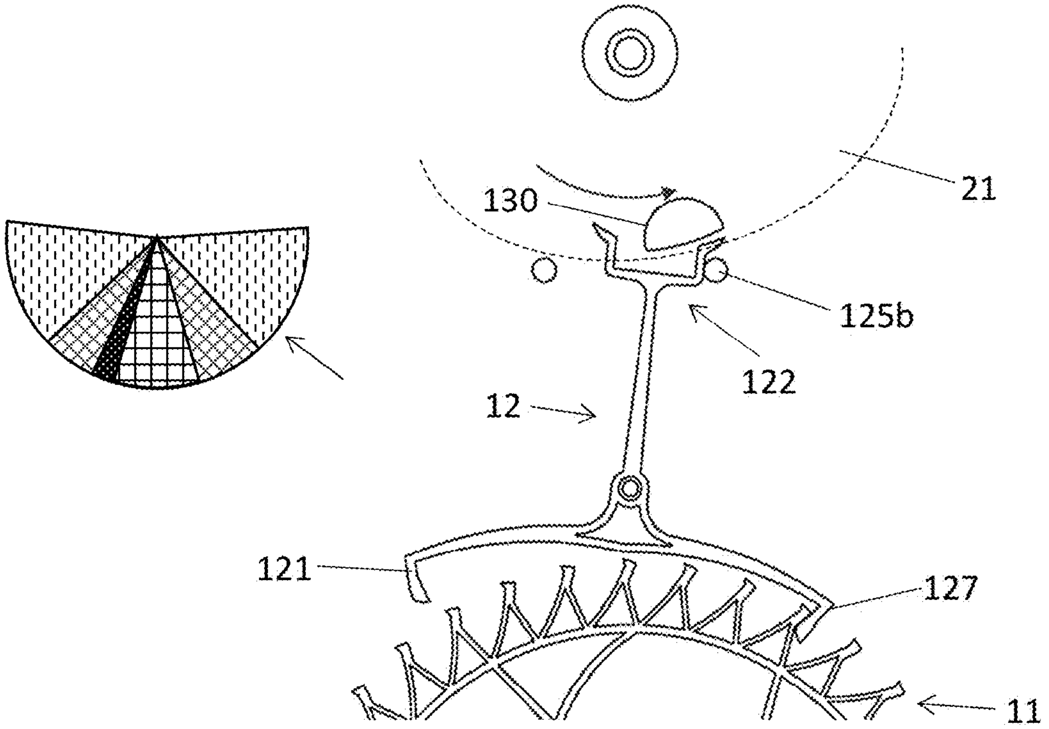
FIG. 14 shows the escapement during a free-oscillation phase.

FIG. 14 shows the escapement 10 during a second phase of free oscillation that occurs after the second frictional locking phase. The pin 130 is free and will remain so until the next frictional locking phase. The fork 122 of the anchor 12 has reached the exit banking pin 125*b*. The escape wheel 11 is immobilized by the anchor 12 and both are stationary. During the second free-oscillation phase there is no contact between the pin 130 and the fork 122. Contact between the pin 130 and the fork 122 occurs during the second frictional locking phase.

During the second free-oscillation phase, the angular position of the inertial element is greater than the angular position of the end of the second frictional locking $\theta_{RF2}$.

Figure 15:
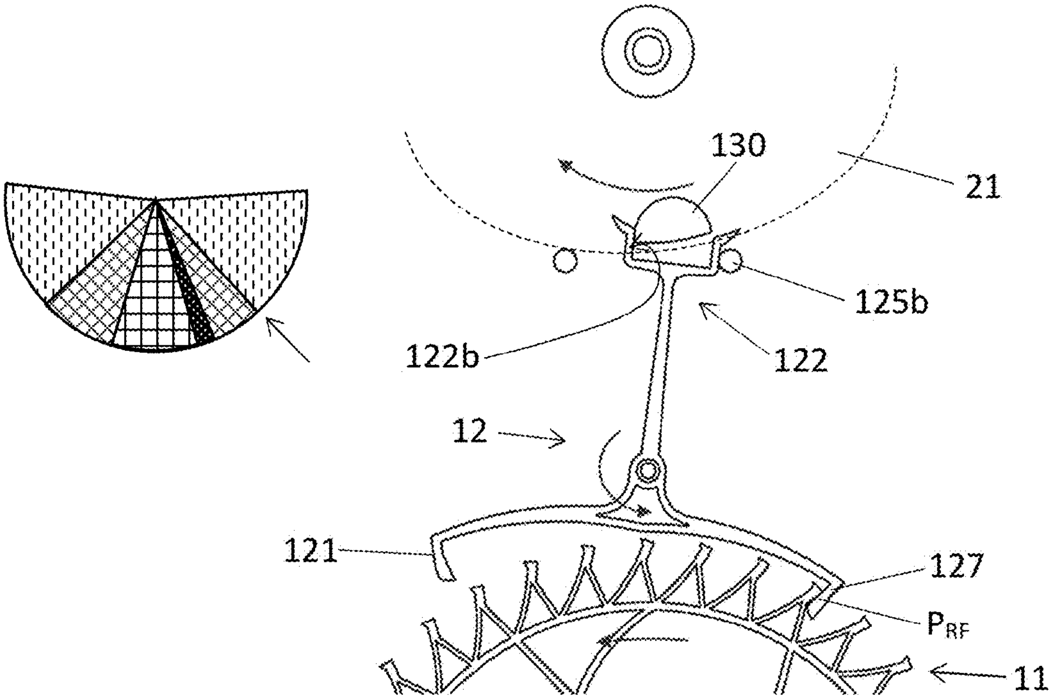
FIG. 15 shows the escapement during the first frictional locking phase, when the oscillator is oscillating in the clockwise direction.

FIG. 15 shows the escapement 10 at the start of the first frictional locking phase, when the oscillator is oscillating in the clockwise direction. This phase does not exist in a conventional anchor escapement. The pin 130, which rotates in the clockwise direction, encounters the second fork face

122*b* of the anchor 12 which is making ready to rotate in the anticlockwise direction. In this position, if the system was at a standstill, it would be the elastic torque of the oscillator that would cause the escapement 10 to turn. The escape wheel 11 is immobilized by the anchor 12 and cannot advance. When the anchor 12 turns, under the action of the pin 130 on the second fork face 122*b* of the fork 122, the escape wheel 11 will recoil slightly, pushed back by the pallet frictional locking face $P_{RF}$ of the exit pallet stone 127.

During the first frictional locking phase, the inertial element pivots from the angular position of the start of the first frictional locking $\theta_{RF1}$ to the angular position of the start of unlocking $\theta_{DE}$.

The pin 130 is therefore configured to push the fork 122 during the first frictional locking phase and the second frictional locking phase. During these phases, a tooth 112 of the escape wheel 11 is in rubbing contact with the pallet frictional locking face $P_{RF}$ of the entry pallet stone 121 or of the exit pallet stone 127. The pin 130 is not in contact with the fork 122 over the portions of free oscillation of the inertial element that precede the first frictional locking phase and succeed the second frictional locking phase.

It should be noted that the self-starting of the escapement 10 is dependent not on the frictional locking angle $\Theta_{RF}$ but only on the lift angle $\Theta_{LE}$. Thus, because the addition of these frictional locking phases enables the lift angle $\Theta_{LE}$ to be reduced, the proposed escapement considerably facilitates the self-starting of the oscillator. The presence of the first frictional locking phase and of the first free-oscillation phase means that the escapement 10 can be characterized as a semi-detached escapement. The escapement 10 is also self-starting.

The escapement 10 may be configured so that the frictional locking angle $\Theta_{RF}$, which corresponds to the portion of oscillation from the angular position of the inertial element of the start of the first frictional locking $\theta_{RF1}$ to the angular position of the end of the second frictional locking $\theta_{RF2}$, is at most 12°.

The same phases as those described hereinabove occur again when the oscillator is oscillating in the clockwise direction.

It will be noted that, in order for the first and second frictional locking phases to be able to occur, the escapement needs to be configured so that the pin 130 is in contact with the fork 122 in such a way as to push it when the angular position of the inertial element with respect to the center line $\theta_0$ is smaller than the frictional locking half-angle $\Theta_{RF}/2$ and greater than the lift half-angle $\Theta_{LE}/2$. More particularly, the first fork face 122*a* and the second fork face 122*b* need to be dimensioned so that they can engage with the pin 130 in this angular range.

Starting and Low Amplitudes

When the oscillator 2 starts up or operates at amplitudes less than or equal to the frictional locking half-angle $\Theta_{RF}/2$, the escapement 10 operates like a frictional locking escapement. In this mode, anti-reversing members are unnecessary because the pin does not leave the fork. If the escapement 10 is able to push the inertial element 21 to the limit of the lift half-angle $\Theta_{LE}/2$ (which corresponds to the angular position of end of impulse $\theta_{IM}$), then the system is self-starting. The dynamics of the escapement 10 when the oscillator starts up or is operating at amplitudes less than or equal to a frictional locking half-angle $\Theta_{RF}/2$ are illustrated in FIGS. 16*a*-16*c* when the oscillator is oscillating in the clockwise direction, and in FIGS. 16*d* to 16*f* when the oscillator is oscillating in the anticlockwise direction.

Figures 16A, 16B, 16C, 16D, 16E, 16F:
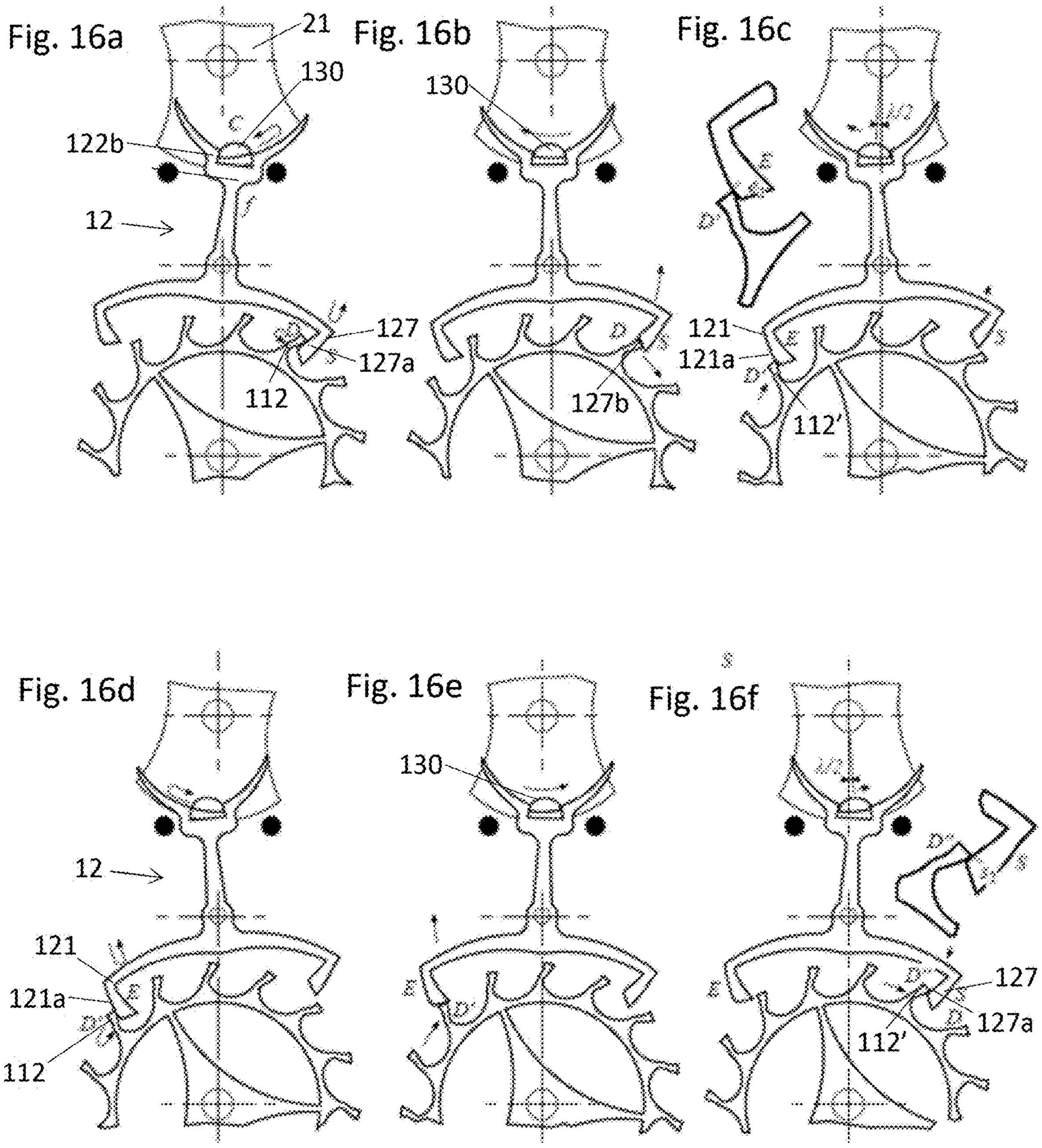
FIGS. 16*a*-16*f* show phases of the escapement with low oscillator amplitudes.

In FIG. 16*a*, a tooth 112 is bearing against the anchor exit face of rest 127*a* of the exit pallet stone 127. The second fork face 122*b* of the fork 122 is in contact with the pin 130 and accompanies the inertial element 21 in its oscillation. If the oscillation is sufficiently great, then the escape wheel 11 makes a slight movement due to the draw of the anchor exit face of rest 127*a*.

In FIG. 16*b*, the inertial element 21 has entered the lift angle $\Theta_{LE}$ and completed the unlocking. The fork has taken up its clearance and pushes the pin 130 with the first fork face. The tooth 112 supplies its impulse to the exit pallet stone 127, via the anchor exit impulse face 127*b*.

In FIG. 16*c*, the inertial element 21 reaches the limit of the lift angle $\Theta_{LE}$. At the end of the impulse on the anchor exit impulse plane 127*b* of the exit pallet stone 127, another tooth 112' drops onto the anchor entry face of rest 121*a* of the entry pallet stone 121. The pin 130, still engaged in the fork 122, driving the latter with it.

FIGS. 16*d*-16*f* illustrate the same phases as FIGS. 16*a*-16*c* respectively. A tooth 112 comes into contact with the anchor entry face of rest 121*a* of the entry pallet stone 121 (FIGS. 16*a* and 16*b*). The inertial element 21 and the anchor 12 rotate in the opposite direction to the direction illustrated in FIGS. 16*a*-16*c*. When the balance 21 reaches the limit of the lift angle $\Theta_{LE}$ (FIG. 16*f*), another tooth 112' drops onto the anchor exit face of rest 127*a* of the exit pallet stone 127.

Safety Measures

Figure 17A:
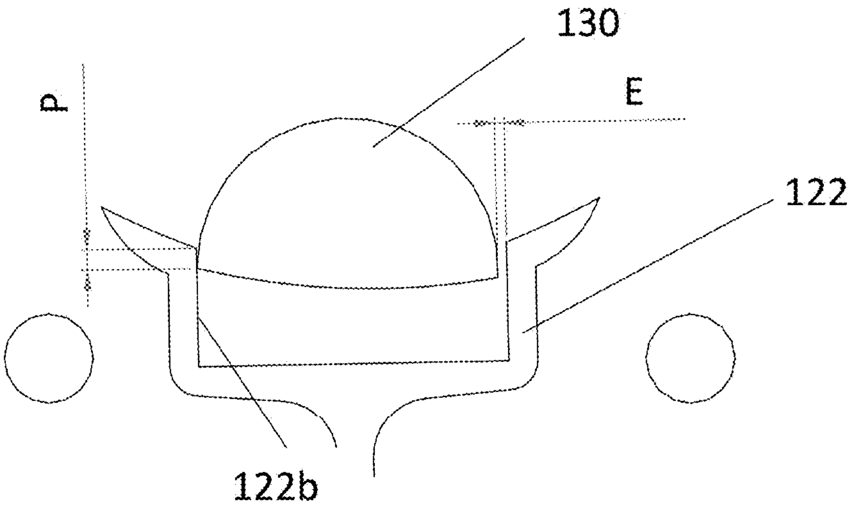
FIGS. 17*a*-17*b* illustrate the side clearance and the penetration (FIG. 17*a*) of the pin into the fork in a start-ofimpulse position and the unlocking clearance (FIG. 17*b*) of the pin in the fork in a position of end of second frictional locking.
Figure 17B:
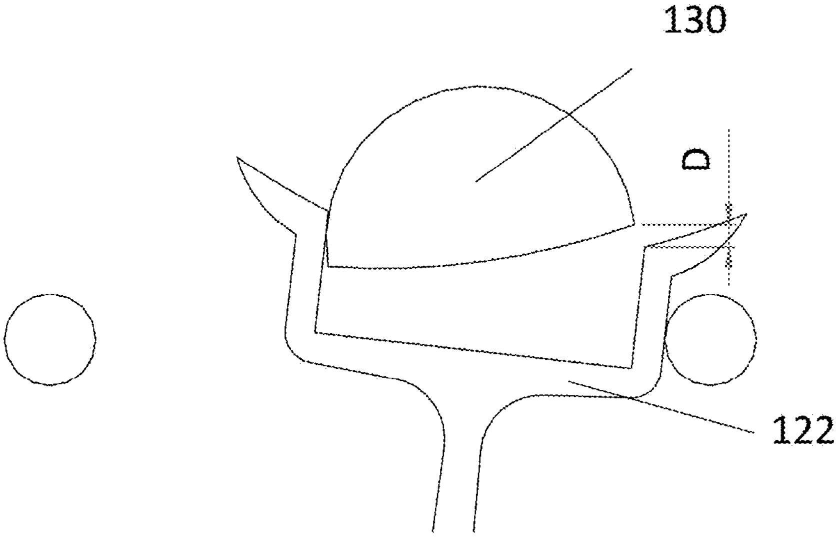

The fork-pin mechanism of the escapement 10 needs to be provided with sufficient safety measures and elements to prevent the escapement from being able to be brought into a locked-up position. In concrete terms, the safety measures and elements concerned are the distances between the pin 130 and the fork 122 in particular positions of the escapement 10 and these have to be dimensioned according to the inaccuracies in the manufacture and assembly of the escapement components. FIG. 17*a* illustrates the clearance E and the penetration P of the pin 130 into the fork 122 in a position of start of impulse (which corresponds to the position of the escapement in FIG. 9). The clearance E serves to prevent the pin from becoming wedged in the fork and the penetration P serves to ensure that the second fork face 122*b* pushes on the pin during impulse. FIG. 17*b* illustrates the unlocking clearance D of the pin 130 in the fork 122 in a position of end of second frictional locking (which corresponds to the position of FIG. 13, disregarding the draw). The unlocking clearance D serves to ensure that the pin 130 can exit the fork 122. It is these three distances (E, P and D) which become too small when a traditional detached anchor escapement (without frictional locking) is constructed for lift angles of less than around 10°.

As shown in FIGS. 18*a* and 18*b*, for amplitudes of oscillation of the inertial element 21 beyond the frictional locking half-angle $\Theta_{RF}/2$, the pin 130 exits the fork 122. The anchor 12 is then at rest, bearing against the entry banking pin 125*a* (FIG. 18*a*) or the exit banking pin 125*b* (FIG. 18*b*), and the escape wheel 11 remains stationary. The escapement 10 then needs to comprise a member that prevents reversing, which is to say that prevents the anchor 12 from rocking as this would cause the disc pin 130 and the horn 123 to come into contact. A reversing-prevention member may comprise a guard pin 124 and/or a pair of horns 123. In the case of an oscillator 2 intended for the escapement 1 described here, the oscillations of the oscillator have typically low amplitudes: the guard pin 124 may then prove to be unnecessary and the pair of horns 123, or any equivalent system, may suffice. In instances in which the fork (or the pin) is wide enough, there is also no need for a guard pin.

FIGS. 19*a*-19*f* illustrate various positions of the fork 122 and of a tooth 112 with respect to the pallet stones 121, 127 for amplitudes of oscillation of the inertial element 21 beyond the frictional locking half-angle $\Theta_{RF}/2$. With reference to FIGS. 19*a* and 19*d*, the inertial element 21 freely travels its additional arc. Thanks to the draw of the tooth 112 on the pallet frictional locking face $P_{RF}$ of the exit pallet stone 127, the fork 122 is wedged against the exit banking pin 125*b* or against any other limiting member. The rest position is such that on the return of the inertial element 21, the pin 130 freely enters the fork 122.

With reference to FIGS. 19*b* and 19*e*, following a knock, the fork 122 leaves its rest position. The guard pin 124 and the small disc 132 perform their role of anti-reversing members. The tip of the guard pin 124 comes into contact with the small disc 132, preventing the anchor 12 from moving to the wrong side. The tip 112*a* of the tooth is still engaged with the pallet frictional locking face $P_{RF}$ of the exit pallet stone 127. Once the knock has passed, the anchor 12 is returned to the rest position by the draw. The pin 130 moves freely past the horn 123.

With reference to FIGS. 19*c* and 19*f*, the guard pin 124 has entered the cut out 132*a* in the small disc 132. In this configuration, the guard pin 124 is inactive and incapable of restraining the anchor 12. It is then the horn 123, immobilized by the pin 130, that prevents reversing in the event of a knock. The tip 112*a* of the tooth 112 is still engaged on the pallet frictional locking face $P_{RF}$ of the exit pallet stone 127. Once the knock has passed, the anchor 12 returns to its position of equilibrium as a result of the draw.

Other aspects

The escapement 10 according to the invention, which is to say the anchor 12, the pin 130, and/or the escape wheel 11, can be made from silicon using the usual etching techniques. This material has numerous benefits: it does not experience fatigue failure, is nonmagnetic and has no plastic domain. Furthermore, silicon allows the mass production of components with high machining precision while offering a great deal of design freedom. Alternatively, the escapement 10 may be manufactured from a material selected from the group of materials comprising ceramic, glass, and a metallic glass or alloy. For example, the selected material may comprise silicon nitride, silicon carbide, steel, gold or one of the alloys thereof, nickel, nickel phosphorus, brass, steel, an amorphous alloy, a copper alloy, beryllium copper, or nickel silver.

Because the escapement 10 can be configured so that the frictional locking angle $\Theta_{RF}$ is at most 12°, and so that the horns 123 are able to prevent any reversal of the anchor up to an amplitude of 36°, the anchor 12 is able not to comprise the guard pin 124. It is therefore possible to manufacture the anchor 12 on a single level, which is to say that the anchor 12 can be comprised in the one single plane, without the guard pin 124 fixed at a level above (or below) the level of the anchor 12 and of the fork 122.

Implementation Examples

Figure 20:
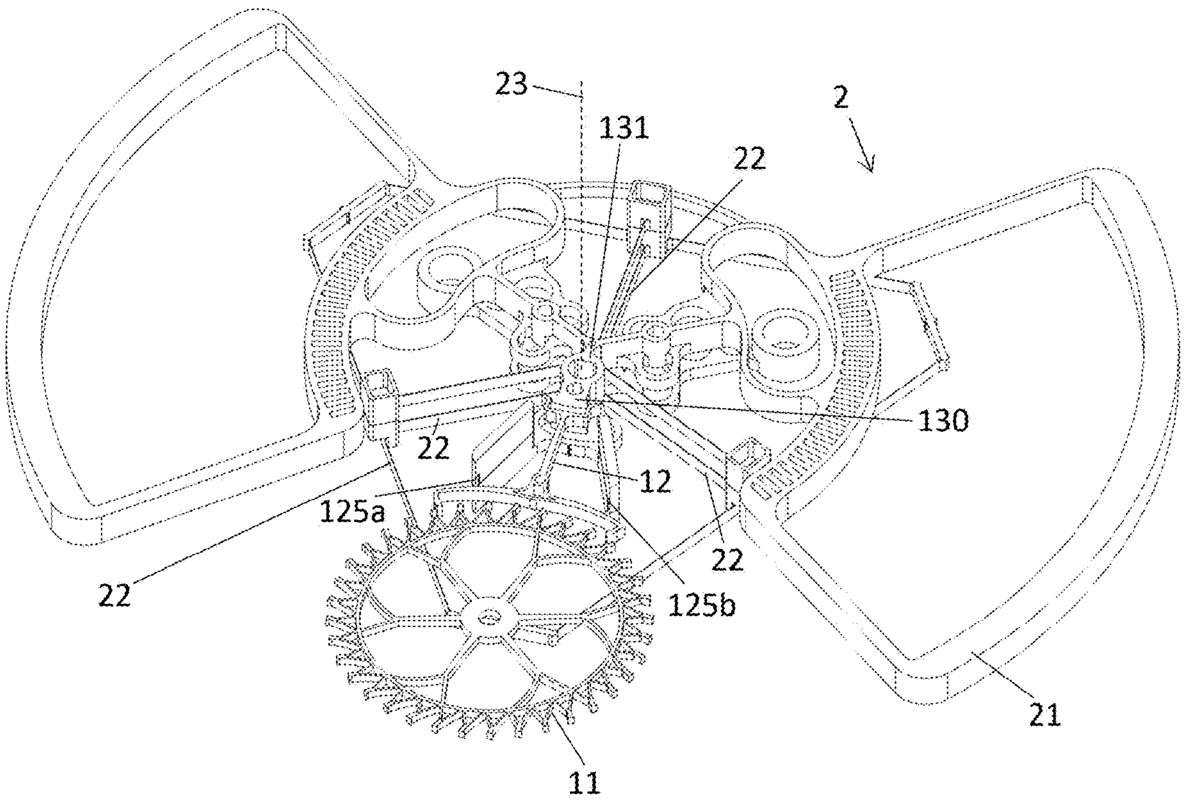
FIG. 20 shows the escapement collaborating with a flexure-pivot oscillator according to a first example.
Figure 21:
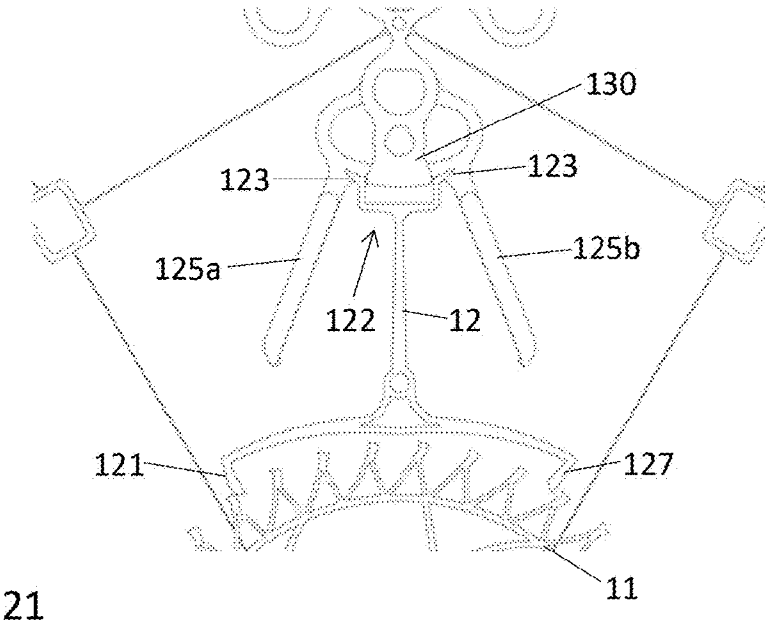
FIG. 21 shows a detail of the escapement of FIG. 20.

The regulator 1 described here is particularly well suited to a flexure-pivot oscillator 2. An example of the incorporation of the escapement 10 into a type CR3 oscillator as described by the present applicant in patent EP3299905B1 is illustrated in FIG. 20. FIG. 21 shows a detail of the escapement 10.

In this example, the pin 130 that interacts with the anchor 12, as well as the banking pins 125*a*, 125*b*, are incorporated directly into the inertial element 21 of the oscillator 2. In addition to the pin 130 interacting with the anchor 12, the oscillator 2 comprises an restoring force element comprising a flexible pivot comprising flexible blades 22. The flexible pivot 22 serves both to elastically return and to guide the rotation of the inertial element 21. The flexible pivot 22 is fixed at one end to a plate (not depicted) and connected at the other end to the inertial element 21.

The oscillator 2 typically has 20° of amplitude. The horns 123 may prevent any reversing of the anchor 12 up to an amplitude of 36°, and so a guard pin is unnecessary in this example. The frictional locking angle $\Theta_{RF}$ is approximately 10° and the lift angle $\Theta_{LE}$ is approximately 5°.

It is possible to substitute for the type CR3 oscillator a Wittrick-type oscillator as described by the present applicant in patent EP3299905B1.

Naturally, these two examples are nonlimiting and, by its very design, the present escapement is not limited to a specific family of flexure-pivot oscillators.

REFERENCE NUMERALS USED IN THE FIGURES

1 Mechanical regulator for horology
10 Escapement
11 Escape wheel
112, 112' Tooth
112*a* Tooth tip
112*b* Tooth heel
12 Anchor
121 Entry pallet stone
122 Fork
122*a* First fork face
122*b* Second fork face
123 Horn
124 Guard pin
125 Banking pin
125*a* Entry banking pin
125*b* Exit banking pin
126 Anchor pivot staff
127 Exit pallet stone
128 Pallet impulse tip
130 Impulse cam, pin
131 Disc
132 Small disc
132*a* Small disc cut out
2 Oscillator
21 Inertial element, balance
22 Restoring force element, flexible blade
23 Oscillator staff
$\theta_{DE}$ Angular position of start of unlocking
$\theta_{IM}$ Angular position of end of impulse
$\theta_{RF1}$ Angular position of start of first frictional locking
$\theta_{RF2}$ Angular position of end of second frictional locking
$\Theta_{LE}$ Lift angle
$\Theta_{LI}$ Free-oscillation angle
$\Theta_{RF}$ frictional locking angle
$A_O$ Amplitude of oscillation
M Torque
$P_{DE}$ Pallet unlocking face
$P_{IM}$ Pallet impulse face
$P_{RE}$ Pallet frictional locking face
E Clearance between fork and pin
P Penetration of pin into fork
D Pin unlocking clearance

The invention claimed is:

1. A mechanical regulator for horology comprising an escapement collaborating with an oscillator provided with an inertial element oscillating in an oscillation plane by virtue of a restoring force element;

the escapement comprising a pin rigidly connected to the inertial element, an anchor and an escape wheel comprising a plurality of teeth; the anchor comprising a fork comprising a first fork face and second fork face and being configured to collaborate with the pin, an entry pallet-stone and an exit pallet-stone, each of the pallet-stones being configured to collaborate with teeth of the escape wheel;

the escapement being configured such that, during an unlocking phase, the pin pushes the fork in order to release the escape wheel from one of the pallet-stones and, during an impulse phase, the fork pushes the pin in order to transmit to the inertial element a torque of the escape wheel that is in contact with one of the pallet-stones;

wherein the regulator is configured such that the unlocking phase is preceded by a first frictional locking phase, the first frictional locking phase being preceded by a first free-oscillation phase, and the impulse phase is followed by a second frictional locking phase, the second frictional locking phase being followed by a second free-oscillation phase;

wherein during each of the free-oscillation phases, the inertial element oscillates freely with no contact between the pin and the fork;

wherein during the first frictional locking phase and the second frictional locking phase, the pin is in contact with the fork so as to push the fork, and one of the teeth of the escape wheel is in rubbing contact with one of the pallet-stones;

wherein each pallet-stone is provided with an unlocking face that comes into contact with a tooth during the unlocking phase, and with an impulse face that comes into contact with said one of the teeth during the impulse phase;

wherein each of the pallet-stones is further provided with a pallet frictional locking face configured to come into rubbing contact with said one of the teeth, during the first and second frictional locking phase; and wherein the pallet frictional locking face extends from the unlocking face in a direction opposite to the impulse face, such that during the second frictional locking phase the pallet frictional locking face is in rubbing contact with said one of the teeth when the pin pushes the first fork face in order to disengage therefrom.

2. A regulator according to claim 1, wherein the fork comprises a fork face which is dimensioned so that it can be engaged with the pin during the first frictional locking phase and the second frictional locking phase.

3. A regulator according to claim 1, configured so that the pin is not in contact with the fork during the free-oscillation phases.

4. A regulator according to claim 1, wherein, during the first and second frictional locking phases, the escape wheel is immobilized by the pallet frictional locking face.

5. A regulator according to claim 1, wherein the pallet frictional locking face has a draw.

6. A regulator according to claim 1, wherein a lift angle, corresponding to the portion of oscillation of the inertial element in which an unlocking of the escape wheel and the impulse of the escapement to the inertial element occur, is at most 6°.

7. A regulator according to claim 1, wherein a frictional locking angle, corresponding to the portion of oscillation of the inertial element from the start of the first frictional locking phase to the end of the second frictional locking phase, is at most 12°.

8. A regulator according to claim 1, wherein of the anchor, the pin and the escape wheel, at least one is made of silicon.

9. A regulator according to claim 1, wherein the oscillator comprises a flexure-pivot oscillator.

10. A mechanical regulator for horology comprising an escapement collaborating with an oscillator provided with an inertial element oscillating in an oscillation plane by virtue of a restoring force element;

the escapement comprising a pin rigidly connected to the inertial element, an anchor and an escape wheel comprising a plurality of teeth; the anchor comprising a fork configured to collaborate with the pin, an entry pallet-stone and an exit pallet-stone, each of the pallet-stones being configured to collaborate with teeth of the escape wheel;

the escapement being configured such that, during an unlocking phase, the pin pushes the fork in order to release the escape wheel from one of the pallet-stones and, during an impulse phase, the fork pushes the pin in order to transmit to the inertial element a torque of the escape wheel that is in contact with one of the pallet-stones;

wherein the regulator is configured such that the unlocking phase is preceded by a first frictional locking phase, the first frictional locking phase being preceded by a first free-oscillation phase, and the impulse phase is followed by a second frictional locking phase, the second frictional locking phase being followed by a second free-oscillation phase;

wherein during each of the free-oscillation phases, the inertial element oscillates freely with no contact between the pin and the fork;

wherein during the first frictional locking phase and the second frictional locking phase, the pin is in contact with the fork so as to push the fork, and one of the teeth of the escape wheel is in rubbing contact with one of the pallet-stones;

wherein each pallet-stone is provided with an unlocking face that comes into contact with a tooth during the unlocking phase, and with an impulse face that comes into contact with said one of the teeth during the impulse phase;

wherein each of the pallet-stones is further provided with a pallet frictional locking face configured to come into rubbing contact with said one of the teeth, during the first and second frictional locking phase; and wherein a lift angle, corresponding to the portion of oscillation of the inertial element between the start of the unlocking phase and the end of the impulse phase, is at most 6°;

wherein the escapement is configured to allow the pin in contact with the fork to push the fork when the angular position of the inertial element with respect to a center line is smaller than a frictional locking half-angle and greater than lift half-angle;

wherein the center line is the angular position of the inertial element at equilibrium without the escapement; and wherein the lift half-angle is the angle between the center line and the angular position the of inertial element at the end of the impulse phase; and wherein the frictional locking angle corresponds to the portion of oscillation from the angular position of the inertial element at the start of the first frictional locking phase to the angular position at the end of the second frictional locking phase.

* * * * *